United States Patent
Kim

(10) Patent No.: US 9,652,107 B2
(45) Date of Patent: May 16, 2017

(54) TOUCH SENSOR

(71) Applicant: Dongbu HiTek Co., Ltd., Bucheon-si (KR)

(72) Inventor: Hak Soo Kim, Cheongju-si (KR)

(73) Assignee: Dongbu HiTek Co., Ltd., Bucheon-Si (KR)

( * ) Notice: Subject to any disclaimer, the term of this patent is extended or adjusted under 35 U.S.C. 154(b) by 1 day.

(21) Appl. No.: 14/946,518

(22) Filed: Nov. 19, 2015

(65) Prior Publication Data

US 2016/0266687 A1  Sep. 15, 2016

(30) Foreign Application Priority Data

Mar. 9, 2015  (KR) .................. 10-2015-0032622

(51) Int. Cl.
*G06F 3/045* (2006.01)
(52) U.S. Cl.
CPC .................. *G06F 3/045* (2013.01)
(58) Field of Classification Search
CPC combination set(s) only.
See application file for complete search history.

(56) References Cited

U.S. PATENT DOCUMENTS

| | | | | |
|---|---|---|---|---|
| 4,060,772 A | * | 11/1977 | Yamada | H03K 3/3545 331/116 FE |
| 2013/0063396 A1 | * | 3/2013 | Kim | G06F 3/0418 345/174 |
| 2015/0349736 A1 | * | 12/2015 | Lee | H03G 1/0088 330/282 |

\* cited by examiner

*Primary Examiner* — Van Chow
(74) *Attorney, Agent, or Firm* — Andrew D. Fortney; Central California IP Group, P.C.

(57) ABSTRACT

A touch sensor includes a touch panel including driving lines, sensing lines, node capacitors between neighboring or overlapping driving lines and sensing lines, and a sensing unit electrically connected to the sensing lines and configured to sense a capacitance from the touch panel. The sensing unit includes an input resistor having a first terminal connected to at least one of the sensing lines, a first amplifier including (i) input terminals respectively connected to a second terminal of the input resistor and a first power supply and (ii) a first output terminal, a feedback resistor having a first terminal connected to the first input terminal of the first amplifier, and a feedback amplifier having an input terminal connected to the first output terminal of the first amplifier and an output terminal connected to a second terminal of the feedback resistor. The gain of the feedback amplifier is less than 1.

18 Claims, 4 Drawing Sheets

TOUCH SENSOR

This application claims the benefit of Korean Patent Application No. 10-2015-0032622, filed on Mar. 9, 2015, which is hereby incorporated by reference as if fully set forth herein.

BACKGROUND OF THE INVENTION

Field of the Invention

Embodiments relate to a touch sensor.

Discussion of the Related Art

An input signal of a touch sensor may include a driving signal received via capacitance between the driving and sensing electrodes of a touch panel and a noise signal received via capacitance between an object (e.g., a finger) touching the touch panel and the sensing node of the touch panel. The sensed signal may be an overlap signal of the two signals.

When electromagnetic noise radiated by a fluorescent lamp located near a touch sensor is severe, or when a charger directly connected to a touch sensor causes or injects strong noise, the output of an amplifier (e.g., an operational amplifier) in an analog signal sensing unit of the touch sensor may deviate from a normal operational range. Thus, the output waveform of the analog signal sensing unit may be distorted, and touch information may be delivered abnormally.

The output signal of the amplifier in the analog sensing unit may be prevented from deviating from the normal operational range by increasing the capacitance of a feedback capacitor in the analog sensing unit, or by using a high-order analog filter. However, in this case, the circuit area may increase, and additional power may be consumed.

SUMMARY OF THE INVENTION

Accordingly, embodiments of the invention are directed to a touch sensor capable of reducing the size of a sensing circuit and implementing a high pass filter configured to blocking low-frequency noise.

Additional advantages, objects, and features of the invention will be set forth in part in the description which follows and in part will become apparent to those skilled in the art upon examination of the following or may be learned from practice of the invention. The objectives and other advantages of the invention may be realized and attained by the structure(s) particularly pointed out in the written description and claims hereof as well as the appended drawings.

To achieve these objects and other advantages and in accordance with the purpose(s) of the embodiments, as embodied and broadly described herein, a touch sensor includes a touch panel including driving lines and sensing lines and having node capacitors between neighboring or overlapping driving lines and sensing lines and a sensing unit electrically connected to the sensing lines and configured to sense a capacitance (e.g., a mutual capacitance) from the touch panel. The sensing unit includes an input resistor having a first terminal connected to at least one of the sensing lines, a first amplifier including a first input terminal connected to a second terminal of the input resistor, a second input terminal connected to a first power supply, and a first output terminal, a feedback resistor having a first terminal connected to the first input terminal of the first amplifier, and a feedback amplifier having an input terminal connected to the first output terminal of the first amplifier, and an output terminal connected to a second terminal of the feedback resistor. The gain of the feedback amplifier is less than 1.

A resistance value of the feedback resistor may be less than that of the input resistor.

The gain of the feedback amplifier may be in a range of $\frac{1}{30}$ to $\frac{1}{5}$.

The sensing unit may include a plurality of sensing circuits, and each of the plurality of sensing circuits may be connected to a unique one of the plurality of sensing lines and may include the input resistor, the first amplifier, the feedback resistor and the feedback amplifier.

The feedback amplifier may include a second amplifier including a third input terminal, a fourth input terminal, and a second output terminal connected to the second terminal of the feedback resistor, a first resistor connected between the third input terminal and the second output terminal, a second resistor connected between the second input terminal of the first amplifier and at least one of the third input terminal and the first resistor, a third resistor connected between the fourth input terminal and the first power supply, and a fourth resistor connected between the first output terminal of the first amplifier and at least one of the fourth input terminal and the third resistor.

The resistance value of the first resistor may be equal to that of the third resistor, and the resistance value of the second resistor may be equal to that of the fourth resistor.

The resistance values of the first and third resistors may also be equal to the resistance values of the second and fourth resistors.

The feedback resistor and the feedback amplifier may form a feedback unit, and a resistance value of the feedback unit (or of a resistor having a resistance equivalent to that of the feedback unit) may be greater than that of the feedback resistor.

The resistance value of the feedback unit or the resistor having a resistance equivalent to that of the feedback unit may be the resistance value of the feedback resistor divided by the gain of the feedback amplifier.

The sensing unit may further include a plurality of analog/digital converters, and each of the analog/digital converters may convert an analog output of a unique one of the sensing circuits into a digital signal.

Each of the first amplifier and the second amplifier may be or comprise an operational amplifier.

The touch sensor may further include a driving unit configured to provide driving signals to the driving lines.

It is to be understood that both the foregoing general description and the following detailed description of various embodiments are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle(s) of the invention. In the drawings.

DETAILED DESCRIPTION OF THE INVENTION

Figure 1:
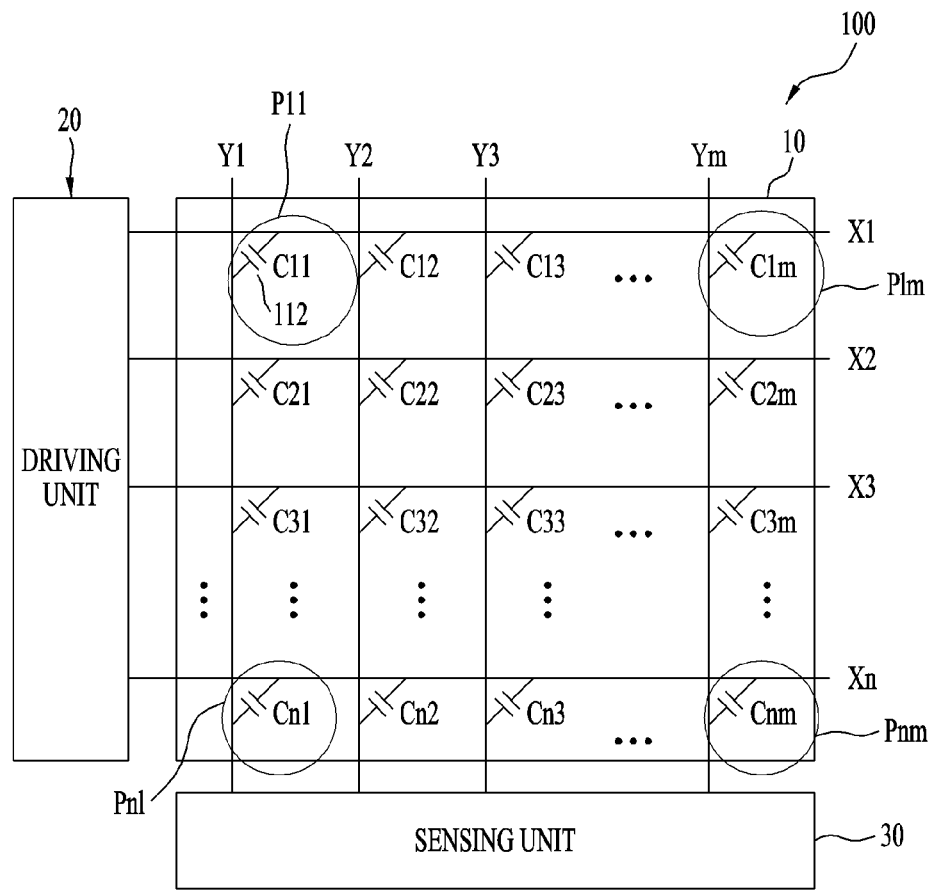
FIG. 1 is a block diagram showing an exemplary touch sensor according to an embodiment.

Hereinafter, exemplary embodiments of the invention will be clearly appreciated through the accompanying drawings and the following description thereof. In the description of the various embodiments, it will be understood that, when an element such as a layer, film, region, pattern or structure is referred to as being formed "on" or "under" another element, such as a substrate, layer, film, region, pad or pattern, it can be directly "on" or "under" the other element, or indirectly "on" or "under" the other element with intervening elements therebetween. It will also be understood that "on" and "under" the element are described relative to the drawings.

In the drawings, the size of each layer may be exaggerated, omitted or schematically illustrated for clarity and convenience. In addition, the size of each constituent element may not wholly reflect an actual or proportional size thereof. In addition, the same reference numerals designate the same constituent elements throughout the description of the drawings.

FIG. 1 is a block diagram showing an exemplary touch sensor 100 according to an embodiment.

Referring to FIG. 1, the touch sensor 100 includes a touch panel 10, a driving unit 20 and a sensing unit 30.

The touch panel 10 substantially performs an independent function and provides a plurality of sensing nodes P11 to Pnm (n and m being natural numbers greater than 1) located at different positions.

The sensing nodes P11 to Pnm (n and m being natural numbers greater than 1) may also be referred to as coordinates, sensing points, or nodes, or cumulatively as a sensing node array.

For example, the touch panel 10 may include a plurality of driving lines X1 to Xn (n being a natural number greater than 1), a plurality of sensing lines Y1 to Ym (m being a natural number greater than 1) and node capacitors C11 to Cnm (n and m being natural numbers greater than 1) formed between neighboring or overlapping driving and sensing lines.

The driving lines X1 to Xn (n being a natural number greater than 1) may also be referred to as driving signal lines or driving electrodes.

In addition, the sensing lines Y1 to Ym (m being a natural number greater than 1) may also be referred to as sensing signal lines or sensing electrodes.

Although the driving lines and the sensing lines are shown as crossing each other in FIG. 1, embodiments are not limited thereto and the driving lines and the sensing lines may not cross each other.

Any one sensing node (e.g., P11) may be defined by any one node capacitor (e.g., C11) formed between any one driving line (e.g., X1) and any one sensing line (e.g., Y1).

For example, the driving line Xi (i being a natural number, $0<i\leq n$) and the sensing line Yj (j being a natural number, $0<j\leq m$) are insulated from each other and the node capacitor Cij may be formed between the driving line Xi (i being a natural number, $0<i\leq n$) and the sensing line Yj (j being a natural number, $0<j\leq m$).

For example, the touch panel 10 may include an electrode pattern layer (not shown) including the sensing and driving electrodes spaced apart from each other, a substrate (not shown) on one side (e.g., in front) of the electrode pattern layer and an insulating layer (not shown) on an opposite side of (e.g., behind) the electrode pattern layer. The layout of the electrode pattern layer may have various shapes according to various design methods.

The electrode pattern layer may include at least one of indium tin oxide (ITO), tin oxide (TO), indium zinc oxide (IZO), indium tin zinc oxide (ITZO), indium aluminum zinc oxide (IAZO), indium gallium zinc oxide (IGZO), indium gallium tin oxide (IGTO), aluminum zinc oxide (AZO), antimony tin oxide (ATO), gallium zinc oxide (GZO), carbon nanotubes (CNT), a conductive polymer, silver, copper and materials formed from a transparent ink, for example.

The electrode pattern layer is coated on one or more layers comprising a glass or plastic to form the sensing arrays P11 to Pnm (n and m being natural numbers greater than 1).

The substrate may be a dielectric film having high light transmittance and may include at least one of glass, polyethylene terephthalate (PET), polyethylene naphthalate (PEN), a polyimide (PI) or a poly(meth)acrylate, for example.

The insulating layer may be a transparent insulating layer such as a PET layer. In another embodiment, a shield layer (not shown) may be located under the insulating layer to prevent electromagnetic interference (EMI) and noise from flowing into the electrode pattern layer.

The touch panel 10 may be merged with a layer for displaying information (e.g., an electrochromic material) according to display panel designs and/or methods, and the layer for displaying information may share paths for driving or sensing with the touch panel. The touch panel that is not merged with the display may have a two-dimensional sensing node array configured using an appropriate method, and the exemplary embodiment is applicable to a touch sensing system including a two-dimensional sensing node array.

The driving unit 20 may be electrically connected to the plurality of driving lines X1 to Xn (n being a natural number greater than 1) and provide driving signals to the driving lines.

The driving unit 20 may provide the driving signals to at least one of the plurality of driving lines X1 to Xn (n being a natural number greater than 1).

For example, the driving unit 20 may sequentially provide the driving signals to the plurality of driving lines X1 to Xn (n being a natural number greater than 1) or may simultaneously provide the driving signals to two or more driving lines.

Here, the term "simultaneously" may encompass not only "substantially simultaneously" but also "precisely simultaneously." For example, simultaneously performed operations may mean that operations substantially simultaneously start and substantially simultaneously finish and/or that the time periods of operation at least partially overlap each other.

The sensing unit 30 may be electrically connected to the plurality of sensing lines Y1 to Ym (m being a natural number greater than 1) and may sense a capacitance of the node capacitors between the driving lines to which the driving signal(s) is/are applied and the sensing line corresponding thereto.

Figure 2:
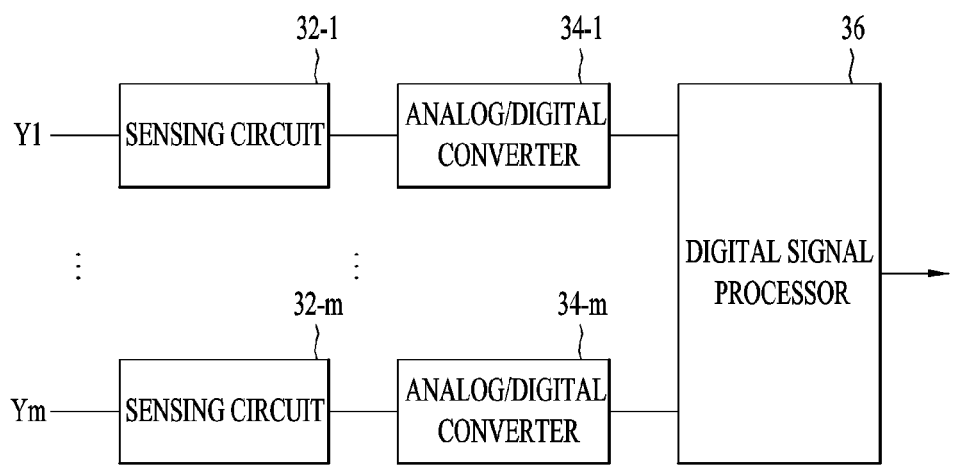
FIG. 2 is a block diagram showing an exemplary embodiment of the sensing unit shown in FIG. 1.
Figure 3:
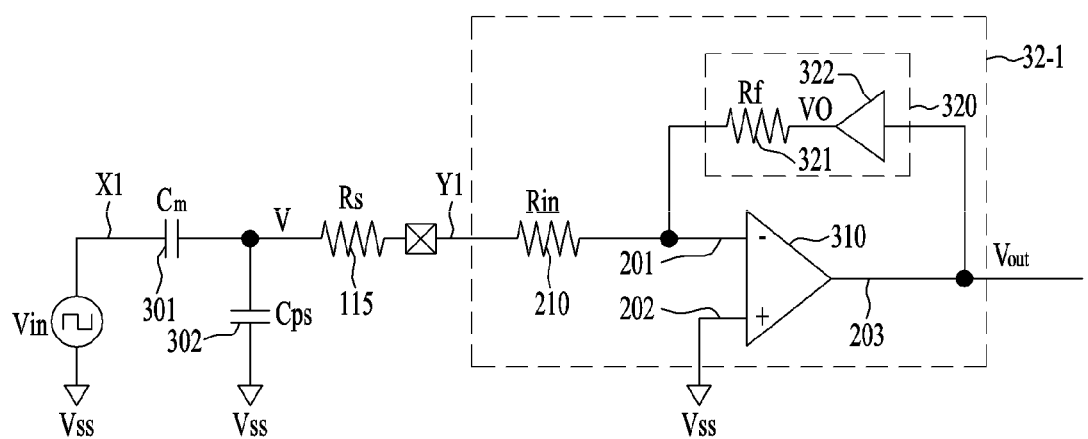
FIG. 3 is a diagram showing an exemplary embodiment of the sensing circuits shown in FIG. 2.

FIG. 2 is a block diagram showing an exemplary embodiment of the sensing unit 30 shown in FIG. 1, and FIG. 3 is a diagram showing an exemplary embodiment of the sensing circuit 32-1 shown in FIG. 2. However, the exemplary sensing circuit 32-1 shown in FIG. 3 can also be used for any of the sensing circuits 32-2 through 32-m shown in FIG. 2.

Referring to FIGS. 2 and 3, the sensing unit 30 includes a plurality of sensing circuits 32-1 to 32-m (m being a natural number greater than 1), a plurality of analog/digital converters 34-1 to 34-m (m being a natural number greater than 1), and a digital signal processor 36.

Each of the plurality of sensing circuits 32-1 to 32-m (m being a natural number greater than 1) may be connected to any one of the plurality of sensing lines Y1 to Ym (m being a natural number greater than 1) and may sense a signal from the sensing line corresponding thereto.

Since the signal received from the sensing line is attenuated due to parasitic capacitance of one or more adjacent sensing lines or parasitic capacitance between the sensing line and the user's finger touching the touch panel, the sensing circuits 32-1 to 32-m (m being a natural number greater than 1) may include an amplifier unit configured to amplify and (optionally) sense the signal delivered to the sensing line.

At least one of the plurality of sensing circuits 32-1 to 32-m (m being a natural number greater than 1) may include an input resistor 210, a first amplifier 310 and a feedback unit 320.

For example, each of the plurality of sensing circuits 32-1 to 32-m (m being a natural number greater than 1) may include the input resistor 210, the first amplifier 310 and the feedback unit 320.

The input resistor 210 is connected between any one (e.g., Y1) of the plurality of sensing lines Y1 to Ym (m being a natural number greater than 1) and an input terminal of the first amplifier 310. The input resistor 210 may, along with the feedback unit 320, serve to control the gain of the sensing circuit 32-1.

For example, a first terminal of the input resistor 210 may be connected to a corresponding sensing line (e.g., Y1), and a second terminal of the input resistor 210 may be connected to a first input terminal 201 of the first amplifier 310.

The first amplifier 310 may include a first input terminal 201 (e.g., an inverting or negative terminal) connected to the first terminal of the input resistor 210, a second input terminal 202 (e.g., a non-inverting or positive terminal) connected to a first power supply (e.g., a ground potential, Vss) and a first output terminal 203 configured to output a sensing signal Vout.

The first amplifier 310 may be a differential amplifier configured to amplify a difference between a first signal input to or received at the first input terminal 201 and a second signal input to or received at the second input terminal 202, and output the sensing signal Vout (e.g., in in accordance with the amplification.

For example, the first amplifier 310 may be implemented as an operational amplifier such as a field effect transistor (FET) or a bipolar junction transistor (BJT), without being limited thereto.

The feedback unit 320 is electrically connected between the first output terminal 203 and the first input terminal 201 of the first amplifier 310.

The feedback unit 320 may include a feedback resistor 321 and a feedback amplifier 322.

The feedback resistor 321 and the feedback amplifier 322 may be connected between the first output terminal 203 and the first input terminal 201 of the first amplifier 310.

The feedback unit 320 may provide or be responsible for negative feedback from the output signal Vout of the first amplifier 310 to the first input terminal 201 of the first amplifier 310.

A first terminal of the feedback resistor 321 may be connected to the first input terminal 201 of the first amplifier 310, and a second terminal of the feedback resistor 321 may be connected to the output terminal of the feedback amplifier 322.

The input terminal of the feedback amplifier 322 may be connected to the first output terminal 203 of the first amplifier 310, and the output terminal of the feedback amplifier 322 may be connected to the second terminal of the feedback resistor 321.

The gain VO/Vout between the input Vout and the output VO of the feedback amplifier 322 may be less than 1. For example, the gain VO/Vout of the feedback amplifier 322 may be from 1/30 to 1/5, without being limited thereto.

The resistance value Rf of the feedback resistor 321 may be less than that Rin of the input resistor 210 (Rf<Rin).

Figure 4:
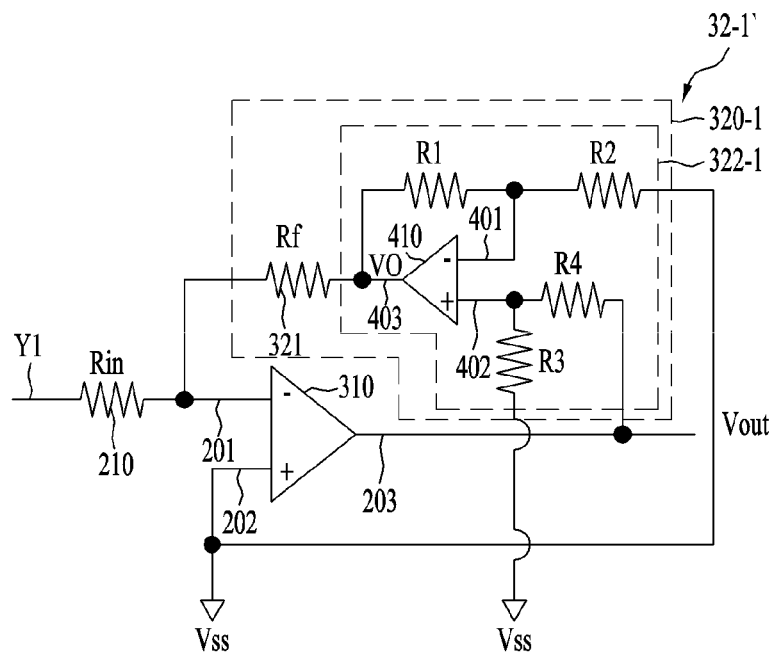
FIG. 4 is a diagram showing another exemplary embodiment of the sensing circuits shown in FIG. 2.

FIG. 4 is a diagram showing another embodiment 32-1' of the sensing circuits 32-1 through 32-m shown in FIG. 2.

The same reference numerals as in FIG. 3 indicate the same components, and a description of these same components will be brief or omitted.

Referring to FIG. 4, the sensing circuit 32-1' may include an input resistor 210, a first amplifier 310 and a feedback unit 320-1.

The feedback unit 320-1 may include a feedback resistor 321 and a feedback amplifier 322-1.

The feedback amplifier 322-1 may include a second amplifier 410 and first to fourth resistors R1 to R4.

The second amplifier 410 may include a third input terminal 401, a fourth input terminal 402, and a second output terminal 403 connected to the feedback resistor 321. For example, the third input terminal 401 may be a negative input terminal, and the fourth input terminal 402 may be a positive input terminal.

The second amplifier 410 may be a differential amplifier configured to amplify a difference between signal input to or received at the third input terminal 401 and a signal input to or received at the fourth input terminal 402. For example, the second amplifier 410 may be implemented as an operational amplifier such as a field effect transistor (FET) or a bipolar junction transistor (BJT), without being limited thereto.

The first resistor R1 may be connected between the third input terminal 401 (e.g., the negative input terminal of the second amplifier 410) and the output terminal 403 of the second amplifier 410 (e.g., the second output terminal).

The second resistor R2 may be connected between (i) at least one of a ground potential Vss and the second (e.g., positive) input terminal 202 of the first amplifier 310, and (ii) at least one of the third input terminal 401 (e.g., the negative input terminal of the second amplifier 410) and the first resistor R1. In the embodiment shown in FIG. 4, the second resistor R2 is connected to the node between (i) the negative input terminal 401 of the second amplifier 410 and (ii) the first resistor R1, as well as (iii) the ground potential Vss and/or (iv) the positive input terminal 202 of the first amplifier 310.

The third resistor R3 may be connected between the fourth input terminal (e.g., the positive input terminal) 402 of the second amplifier 410 and a first power supply (e.g., ground Vss).

The fourth resistor R4 may be connected between the first output terminal 203 of the first amplifier 310 and at least one of the fourth input terminal (e.g., the positive input terminal) 402 of the second amplifier 410 and the third resistor R3 (e.g., the node between the positive input terminal 402 of the second amplifier 410 and the third resistor R3).

Figure 8:
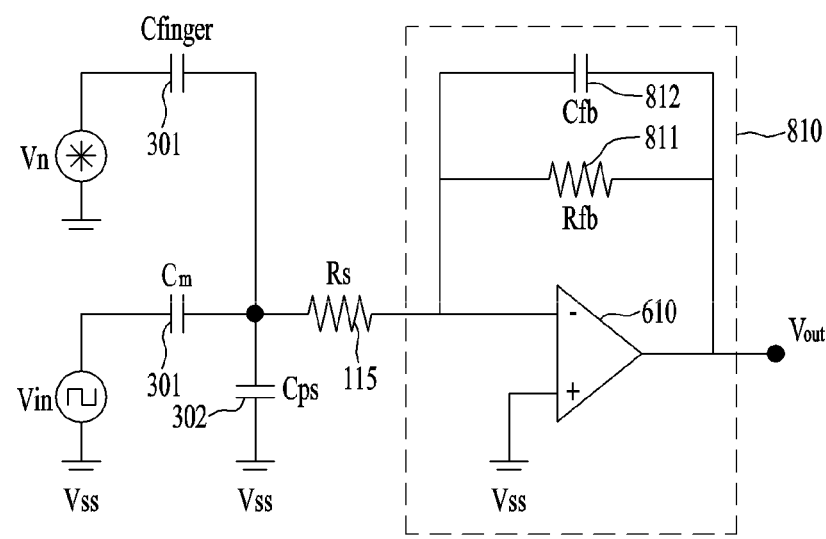
FIG. 8 is a diagram showing a sensing circuit including an amplifier unit, in which a feedback capacitor and a feedback resistor are connected in parallel.

The sensing circuits 32-1 and 32-1' according to the embodiments shown in FIGS. 3 and 4 do not include a feedback capacitor 812 as shown in FIG. 8. Instead of the feedback capacitor 812 of FIG. 8, the sensing circuits 32-1 and 32-1' according to the embodiments include the input resistor 210, the feedback unit 320 including the amplifier 322 having a gain of less than 1, and the feedback resistor 321 to control the gain of the sensing circuits 32-1 and 32-1'.

FIG. 8 is a diagram showing a sensing circuit 810 having a structure in which a feedback capacitor 812 and a feedback resistor 811 are connected in parallel between the output terminal (e.g., Vout) and the input terminal of an amplifier 610.

Referring to FIG. 8, the sensing circuit 810 may include an amplifier 610, a feedback capacitor 812 and a feedback resistor 811.

The feedback capacitor 812 and the feedback resistor 811 may be connected in parallel between the output terminal (e.g., Vout) and the first input terminal (e.g., a negative (−) input terminal) of the amplifier 610. The feedback capacitor 812 may serve as a reference for measuring a mutual capacitance cm of the touch panel.

In FIG. 8, the transfer function H(s) of the input signal Vin and the output signal Vout of the sensing circuit 810 is expressed by Equation 1:

$$H(s) = \frac{Vout(S)}{Vin(S)} = \left(-\frac{s \cdot Rfb \cdot Cm}{(s \cdot Rs(Cm + Cps) + 1) \cdot (s \cdot Cfb \cdot Rfb + 1)}\right)$$

In addition, the output $CA_{OUT}$ of the sensing circuit 810 of FIG. 8 taking environmental noise into consideration is expressed by Equation 2:

$$CA_{OUT} \approx Vin \cdot \left(\frac{Cm}{Cfb}\right) + Vn \cdot \left(\frac{Cfinger}{Cfb}\right)$$

where Vin denotes the driving signal provided to the driving line, and $CA_{OUT}$ denotes the output of the sensing circuit 810 of FIG. 8 (e.g., the output of the amplifier 610 in the pass band of the touch panel).

Vn may denote an environmental noise voltage applied to, or detected or sensed by, the sensing line. Cps may denote a parasitic capacitance between the sensing line and ground (e.g., a ground plane or neighboring metal line carrying a ground potential). Rs may denote a resistance value of a parasitic resistor 115. Cfinger may denote the capacitance (e.g., a parasitic capacitance between an environmental noise source and the sensing line, such as that designated by capacitor 303 in FIG. 5).

The feedback resistor 811 may implement or function as a high pass filter configured to suppress a relatively low frequency band of external environmental noise. The sensing circuit shown in FIG. 8 is advantageous in that the implementation is simple, the accuracy of the measured value of the mutual capacitance Cm can be improved using the feedback capacitor 812, and low frequency noise may be suppressed.

In contrast, in the sensing circuit 810 shown in FIG. 8, when the mutual capacitance Cm of the touch panel increases, the driving signal Vin increases, or noise having a frequency corresponding to the pass band of the sensing circuit 810 occurs, the capacitance Cfb of the feedback capacitor 812 increases such that its effect on the output Vout of the sensing circuit 810 is within the dynamic range of an analog/digital converter that receives the output Vout of the sensing circuit 810. This leads to an excessive increase in chip area or size and cost.

In order to design a high pass filter configured to suppress low-frequency noise due to a DC voltage, the feedback resistor 811 may have a resistance of more than 10 mega-ohms. This leads to an excessive increase in the chip area or size and an increase in cost.

Figure 5:
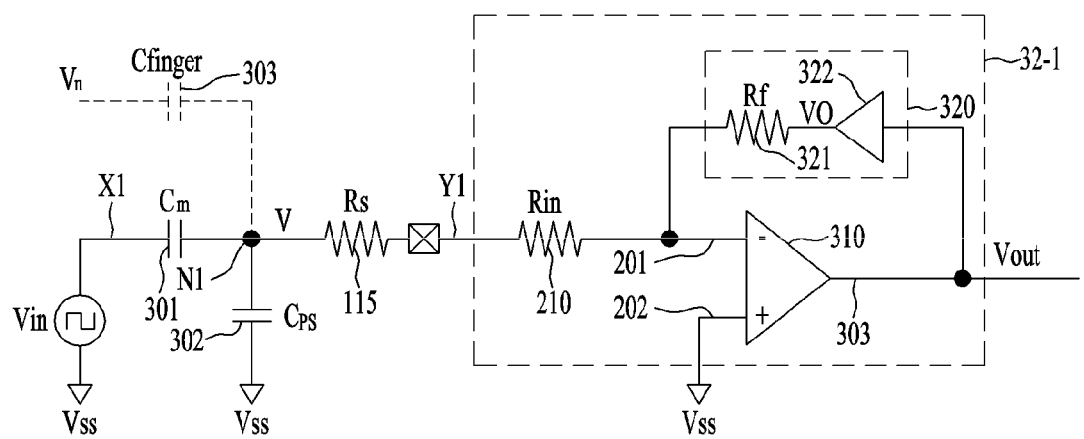
FIG. 5 is a diagram showing a sensing circuit according to the exemplary embodiment of FIG. 3, taking environmental noise into consideration.

FIG. 5 shows the sensing circuit 32-1 according to an embodiment taking environmental noise into consideration.

Referring to FIG. 5, the transfer function H1(s) of the input signal Vin and the output signal Vout of the sensing circuit 32-1 may be defined by Equation 3 below. For example, the input signal Vin may be a driving signal, and the output signal Vout may be the output of the amplifier 310 of the sensing circuit 32-1.

$$H1(s) = \frac{Vout(S)}{Vin(S)} = \left(-\frac{s \cdot RA \cdot Cm}{(s \cdot Rin(Cm + Cps) + 1)}\right)$$

where Vin denotes the driving signal provided to the driving line(s), and Vout denotes the output of the sensing circuit 32-1 (e.g., the output of the output terminal of the amplifier 310).

RA may denote the resistance value of the feedback unit 320 or a resistor having a resistance equivalent to that of the feedback unit 320, Cm may denote the mutual capacitance of the capacitor 301 between the sensing line (e.g., Y1) and the driving line (e.g., X1), Cps may denote the parasitic capacitance between the sensing line (e.g., Y1) and ground (e.g., represented by the capacitor 302), and Rs may denote the parasitic resistance (represented by the resistor 115) of the sensing line (e.g., Y1).

For example, the resistance value RA of the feedback unit 320 or the resistor having a resistance equivalent to that of the feedback unit 320 may be obtained by dividing the resistance value Rf of the feedback resistor 321 by the gain Av of the feedback amplifier 322 (RA=Rf/Av). For example, the gain Av of the feedback amplifier 322 may be a ratio of the output VO of the feedback amplifier 322 (or the voltage thereof) to the input Vout (or the voltage thereof).

Since the gain of the feedback amplifier 322 is less than 1, the resistance value RA of the feedback unit 320 or the resistor having a resistance equivalent to that of the feedback unit 320 may be greater than the resistance value Rf of the feedback resistor 321. Accordingly, even when the feedback resistor 321 has a small resistance value, the resistance value RA of the feedback unit 320 or the resistor having a resistance equivalent to that of the feedback unit 320 may be sufficient to control the gain of the sensing circuit 32-1 by the feedback amplifier 322.

In addition, the output of the sensing circuit 32-taking environmental noise into consideration (e.g., the output Vout at the output terminal 203 of the amplifier 310, as shown in FIG. 3) is expressed by Equation 4:

$$CA1_{OUT} \approx Vin \cdot \left(\frac{Cm}{Cps + Cm}\right) \cdot \left(\frac{RA}{Rin}\right) + Vn \cdot \left(\frac{Cfinger}{Cps + Cfinger}\right) \cdot \left(\frac{RA}{Rin}\right)$$

The feedback capacitor 812 of FIG. 8 may have a capacitance of several tens of pF. The sensing circuit 32-1 according to embodiments of the invention may include an input resistor 210, which may enable removing the feedback capacitor 812 while controlling the gain of the sensing circuit 32-1 (or the output thereof, Vout).

In order to precisely control the gain of the sensing circuit 32-1 or the output thereof and implement a high pass filter having a predetermined or desired cutoff frequency (e.g., of about 50 kHz), the input resistor 210 may be connected to the sensing line (or, optionally, the parasitic resistor 115) in series.

The resistance value Rin of the input resistor 210 may be greater than (e.g., by 5-100 times) the resistance value Rs of the parasitic resistor 115. For example, the resistance value Rs of the parasitic resistor 115 may be 48 kΩ, and the resistance value Rin of the input resistor 210 may be 1 MΩ.

Since the sensing circuit 32-1 does not include the feedback capacitor 812 shown in FIG. 8, the level of the signal received by the sensing line (e.g., Y1) may decrease at a first (e.g., sensing line output) node (e.g., N1 in FIG. 5). For example, the first node N1 may be a node between an output terminal of the sensing line and a corresponding node capacitor in the touch panel. Alternatively, the first node N1 may be a node between the parasitic capacitor 302 of the sensing line Y1 and the mutual capacitor 301 of the touch panel.

In general, since the parasitic capacitance Cps of the sensing line (e.g., Y1) is greater than the mutual capacitance Cm of the touch panel, the level of the signal received by the sensing line (e.g., Y1) may decrease by an amount corresponding to the parasitic capacitance Cps of the sensing line.

The feedback unit 320 includes a feedback resistor 321 and a feedback amplifier 322 having a gain less than 1. Even when the resistance value Rf of the feedback resistor 321 is small, since the gain Av of the feedback amplifier 322 is less than 1, the equivalent resistance value of the feedback unit 320 may increase.

For example, when the resistance value Rf of the feedback resistor 321 is less than the resistance value Rin of the input resistor 210, it is possible to control the equivalent resistance value of the feedback unit 320 by the feedback amplifier 322 having a gain Av less than 1 and to control the gain of the sensing circuit 32-1 or 32-1' within the dynamic range of the analog/digital converter 34-1 (see, e.g., FIG. 2).

For example, when the gain Av of the feedback amplifier 322 is in a range of 1/30 to 1/5, the resistance value RA of the feedback unit 320 may be 5 times to 30 times the resistance value Rf of the feedback resistor 321. However, the gain Av of the feedback amplifier 322 is not limited to this range.

The gain Av of the feedback amplifier 322-1 shown in FIG. 4 may be determined by the resistance values of the first to fourth resistors R1 to R4.

For example, the resistance value of the first resistor R1 and the resistance value of the third resistor R3 of the feedback amplifier 322-1 shown in FIG. 4 may be identical, and the resistance value of the second resistor R2 and the resistance value of the fourth resistor R4 may be identical.

Furthermore, the resistance values of the first and third resistors R1 and R3 of the feedback amplifier 322-1 shown in FIG. 4 may be less than the resistance values of the second and fourth resistors R2 and R4.

For example, the resistance values of the second and fourth resistors R2 and R4 of the feedback amplifier 322-1 shown in FIG. 4 may be 5 times to 30 times the resistance values of the first and third resistors R1 and R3, without being limited thereto.

Figure 6:
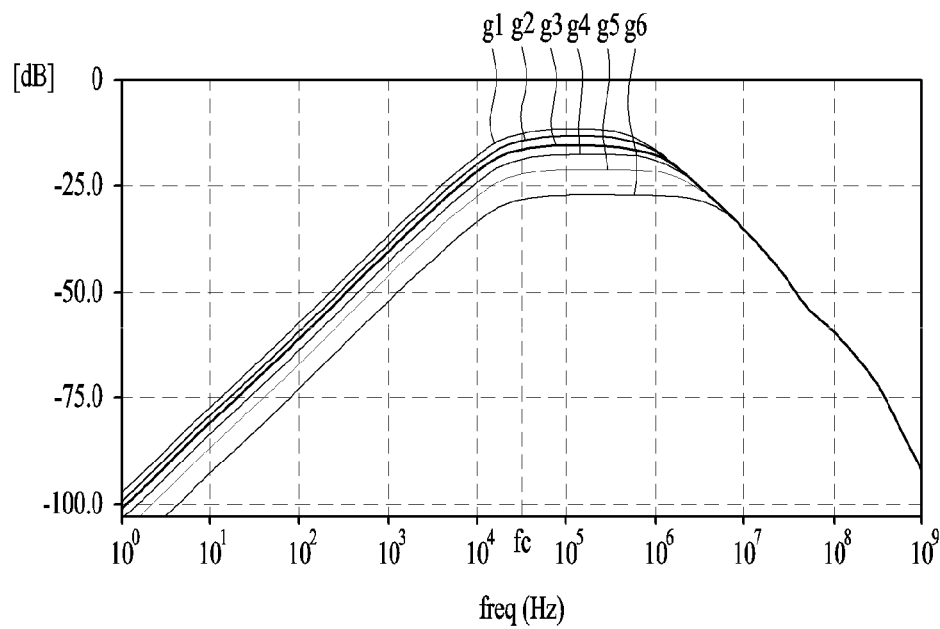
FIG. 6 is a diagram showing a simulation result of an exemplary frequency response property of the embodiment shown in FIG. 5.

FIG. 6 is a diagram showing a simulation result of a frequency response property of the embodiment shown in FIGS. 3 and 5. In FIG. 6, the parasitic capacitance Cps may be 10 times or more the mutual capacitance Cm. For example, Cm may be 0.7 pF, and Cps may be 7 pF. The resistance value Rin of the input resistor 210 may be 1 MΩ, and the resistance value Rf of the feedback resistor 321 may be 100Ω.

Referring to FIG. 6, the curve g1 shows the case in which the gain Av of the feedback amplifier 322 is 1/30, the curve g2 shows the case in which the gain Av of the feedback amplifier 322 is 1/25, the curve g3 shows the case in which the gain Av of the feedback amplifier 322 is 1/20, the curve g4 shows the case in which the gain Av of the feedback amplifier 322 is 1/15, the curve g5 shows the case in which the gain Av of the feedback amplifier 322 is 1/10, and the curve g6 shows the case in which the gain Av of the feedback amplifier 322 is 1/5.

With reference to FIG. 6, by controlling the gain Av of the feedback amplifier 322, it is possible to control the resistance value RA of the feedback unit 320 (or the equivalent resistor thereof) and to control the gain of the sensing circuit 32-1.

That is, as the gain Av of the feedback amplifier 322 decreases, the resistance value RA of the feedback unit 320 (or the equivalent resistor thereof) may increase. As the resistance value RA of the feedback unit 320 (or the equivalent resistor thereof) increases, the gain of the sensing circuit 32-1 may increase.

It can be seen that the cutoff frequency fc of the high pass filter controlled by the resistance value Rin of the input resistor 210 is less than 50 kHz.

Figure 7:
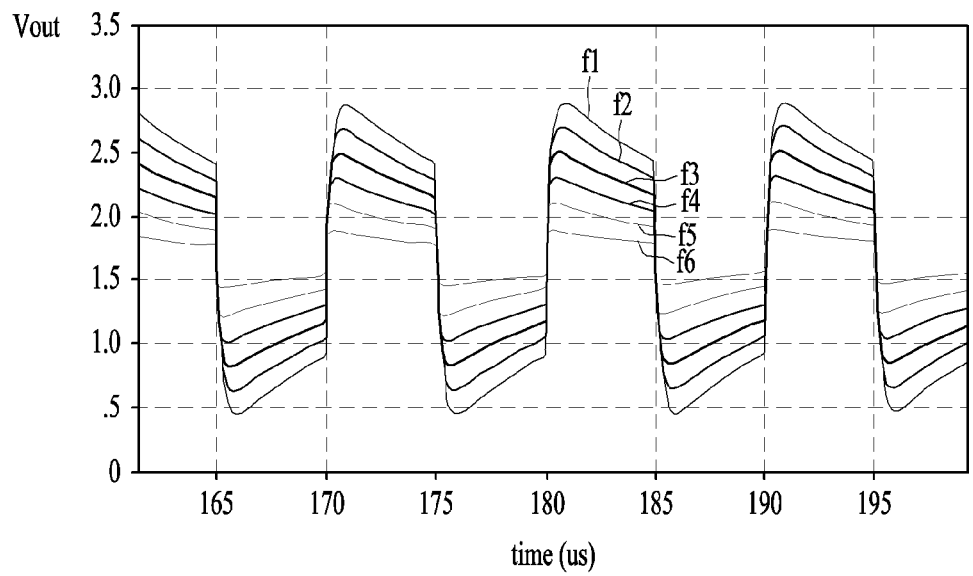
FIG. 7 is a diagram showing a simulation result of exemplary outputs of the sensing circuit of the embodiment shown in FIG. 5.

FIG. 7 is a diagram showing a simulation result of the output Vout of the sensing circuit 32-1 of the embodiment(s) shown in FIG. 5. The simulation conditions may be the same as those of FIG. 6.

The curve f1 shows the case in which the gain Av of the feedback amplifier 322 is 1/30, the curve f2 shows the case in which the gain Av of the feedback amplifier 322 is 1/25, the curve f3 shows the case in which the gain Av of the feedback amplifier 322 is 1/20, the curve f4 shows the case in which the gain Av of the feedback amplifier 322 is 1/15, the curve f5 shows the case in which the gain Av of the feedback amplifier 322 is 1/10, and the curve f6 shows the case in which the gain Av of the feedback amplifier 322 is 1/5.

Referring to FIG. 7, by controlling the resistance value of the feedback unit 320, the level of the output of the sensing circuit 32-1 may be controlled to be within the input dynamic range of the analog/digital converter 34-1 of FIG. 2. Accordingly, the sensing circuit 32-1 may have a wide dynamic range.

For example, as the gain Av of the feedback amplifier 322 decreases, the resistance value of the feedback unit 320 may increase. As the resistance value of the feedback unit 320 increases, the level of the output of the sensing circuit 32-1 may increase.

Since the sensing circuit 32-1 does not include a feedback capacitor (e.g., Cfb in FIG. 8), the gain of which may be determined by the ratio with the mutual capacitor 302, it is possible to reduce the area of the sensing circuit 32-1 and 32-1' (FIGS. 3-5) relative to the sensing circuit 810 (FIG. 8).

According to embodiments of the present invention, it is possible to reduce the size of a sensing circuit and to implement a high pass filter configured to block low-frequency noise.

Features, structures, effects, and the like as described above with respect to various embodiments are included in at least one embodiment of the present invention and should not be limited to only one embodiment. In addition, the features, structures, effects, and the like described in the respective embodiments may be combined or modified with respect to other embodiments by those skilled in the art. Accordingly, contents related to these combinations and modifications should be construed as within the scope of the present invention.

What is claimed is:

1. A touch sensor comprising:
   a touch panel including driving lines and sensing lines and having node capacitors between neighboring or overlapping driving lines and sensing lines; and
   a sensing unit electrically connected to the sensing lines and configured to sense a capacitance from the touch panel, wherein:
   the sensing unit includes:
   an input resistor having a first terminal connected to at least one of the sensing lines;
   a first amplifier including a first input terminal connected to a second terminal of the input resistor, a second input terminal connected to a first power supply, and a first output terminal;
   a feedback resistor having a first terminal connected to the first input terminal of the first amplifier; and
   a feedback amplifier having an input terminal connected to the first output terminal of the first amplifier and an output terminal connected to a second terminal of the feedback resistor, and
   a gain of the feedback amplifier is less than 1.

2. The touch sensor according to claim 1, wherein a resistance value of the feedback resistor is less than that of the input resistor.

3. The touch sensor according to claim 1, wherein the gain of the feedback amplifier is in a range of 1/30 to 1/5.

4. The touch sensor according to claim 1, wherein:
   the sensing unit includes a plurality of sensing circuits, and
   each of the plurality of sensing circuits is connected to a unique one of the plurality of sensing lines.

5. The touch sensor according to claim 4, wherein each of the plurality of sensing circuits includes the input resistor, the first amplifier, the feedback resistor and the feedback amplifier.

6. The touch sensor according to claim 1, wherein the feedback amplifier includes:
   a second amplifier including a third input terminal, a fourth input terminal, and a second output terminal connected to the second terminal of the feedback resistor.

7. The touch sensor according to claim 6, wherein the feedback amplifier further includes:
   a first resistor connected between the third input terminal and the second output terminal; and
   a second resistor connected between the second input terminal of the first amplifier and at least one of the third input terminal and the first resistor.

8. The touch sensor according to claim 7, wherein the second resistor is connected to (i) a first node between the third input terminal of the second amplifier and the first resistor, and (ii) a second node between the second input terminal of the first amplifier and a ground potential.

9. The touch sensor according to claim 7, wherein the feedback amplifier further includes:
   a third resistor connected between the fourth input terminal and the first power supply; and
   a fourth resistor connected between the first output terminal of the first amplifier and at least one of the fourth input terminal and the third resistor.

10. The touch sensor according to claim 9, wherein the first power supply is the ground potential.

11. The touch sensor according to claim 9, wherein the fourth resistor is connected to (i) a third node between the fourth input terminal of the second amplifier and the third resistor, and (ii) the first output terminal of the first amplifier.

12. The touch sensor according to claim 9, wherein the resistance value of the first resistor is equal to that of the third resistor and the resistance value of the second resistor is equal to that of the fourth resistor.

13. The touch sensor according to claim 9, wherein the resistance values of the first and third resistors are equal to the resistance values of the second and fourth resistors.

14. The touch sensor according to claim 1, wherein:
   the feedback resistor and the feedback amplifier form a feedback unit, and
   a resistance value of the feedback unit is greater than that of the feedback resistor.

15. The touch sensor according to claim 14, wherein the resistance value of the feedback unit is the resistance value of the feedback resistor divided by the gain of the feedback amplifier.

16. The touch sensor according to claim 5, wherein:
   the sensing unit further includes a plurality of analog/digital converters, and
   each of the analog/digital converters converts an analog output of a unique one of the sensing circuits into a digital signal.

17. The touch sensor according to claim 6, wherein each of the first amplifier and the second amplifier comprises an operational amplifier.

18. The touch sensor according to claim 1, further comprising a driving unit configured to provide driving signals to the driving lines.

* * * * *